(12) United States Patent
Pitt

(10) Patent No.: US 11,078,972 B2
(45) Date of Patent: Aug. 3, 2021

(54) HEAVY VEHICLE DRUM BRAKE IMPROVEMENTS

(71) Applicant: Ken Pitt, Strathalbyn (AU)

(72) Inventor: Ken Pitt, Strathalbyn (AU)

( * ) Notice: Subject to any disclaimer, the term of this patent is extended or adjusted under 35 U.S.C. 154(b) by 0 days.

(21) Appl. No.: 16/462,926

(22) PCT Filed: Nov. 15, 2017

(86) PCT No.: PCT/AU2017/000239
§ 371 (c)(1),
(2) Date: May 21, 2019

(87) PCT Pub. No.: WO2018/094441
PCT Pub. Date: May 31, 2018

(65) Prior Publication Data
US 2019/0309808 A1 Oct. 10, 2019

(30) Foreign Application Priority Data
Nov. 22, 2016 (AU) ............... 2016904767

(51) Int. Cl.
*F16D 51/00* (2006.01)
*F16D 51/22* (2006.01)
(Continued)

(52) U.S. Cl.
CPC ............ *F16D 51/22* (2013.01); *F16D 65/08* (2013.01); *F16D 65/09* (2013.01); *F16D 65/22* (2013.01);
(Continued)

(58) Field of Classification Search
CPC ...... F16D 65/08; F16D 65/09; F16D 2125/30; F16D 51/20; F16D 51/22; F16D 51/24
(Continued)

(56) References Cited

U.S. PATENT DOCUMENTS 1,657,852 A * 1/1928 Bendix ............... F16D 65/08
188/250 F
1,681,014 A * 8/1928 Sanford .............. F16D 65/22
188/250 F
(Continued)

FOREIGN PATENT DOCUMENTS

DE 102014218938 * 3/2016 ............ F16D 65/09
GB 345248 A 3/1931
(Continued)

OTHER PUBLICATIONS

Machine translation of DE 102014218938 (no date).*
(Continued)

*Primary Examiner* — Nicholas J Lane
(74) *Attorney, Agent, or Firm* — Christensen O'Connor Johnson and Kindness, PLLC

(57) ABSTRACT

The present disclosure relates to vehicle drum brakes. In one aspect, there is provided a brake shoe comprising a guide at or near its free end, which prevents brake shoe misalignment. According to a further aspect, there is provided a guide for attachment to a brake shoe at or near its free end, which prevents brake shoe misalignment. According to a further aspect, there is provided a drum brake assembly comprising a brake shoe comprising the guide.

7 Claims, 5 Drawing Sheets

(51) Int. Cl.
  *F16D 65/08* (2006.01)
  *F16D 65/09* (2006.01)
  *F16D 65/22* (2006.01)
  *F16D 121/14* (2012.01)
  *F16D 125/30* (2012.01)
  *F16D 125/28* (2012.01)

(52) U.S. Cl.
  CPC ...... *F16D 2121/14* (2013.01); *F16D 2125/28* (2013.01); *F16D 2125/30* (2013.01); *F16D 2250/0076* (2013.01)

(58) Field of Classification Search
  USPC .............. 188/329, 330, 250 C, 250 D, 250 F
  See application file for complete search history.

(56) References Cited

U.S. PATENT DOCUMENTS

| | | | | |
|---|---|---|---|---|
| 1,726,413 | A | * | 8/1929 | Sanford ............... F16D 65/22 188/78 |
| 1,737,013 | A | * | 11/1929 | La Brie ............... F16D 51/56 188/250 D |
| 1,787,494 | A | * | 1/1931 | Sanford ............... F16D 65/22 188/250 F |
| 1,977,916 | A | * | 10/1934 | Nelson ............... B60T 11/043 188/331 |
| 2,051,920 | A | | 8/1936 | Turgot |
| 2,064,103 | A | * | 12/1936 | Burdick ............... F16D 51/22 188/329 |
| 2,161,899 | A | | 6/1939 | Main |
| 2,186,321 | A | | 1/1940 | Boldt et al. |
| 2,568,777 | A | | 9/1951 | Super |
| 3,096,856 | A | | 7/1963 | Burnett |
| 3,677,374 | A | | 7/1972 | Newstead et al. |
| 5,310,028 | A | | 5/1994 | Sampson |
| 5,435,419 | A | | 7/1995 | Muzzy |
| 5,638,928 | A | * | 6/1997 | Wemple ............. F16D 65/0006 188/250 F |
| 6,729,449 | B1 | * | 5/2004 | Doolittle ............. F16D 51/48 188/325 |
| 2006/0016652 | A1 | * | 1/2006 | Clark ................... F16D 65/09 188/330 |

FOREIGN PATENT DOCUMENTS

| | | |
|---|---|---|
| GB | 1281746 A | 7/1972 |
| GB | 1407692 A | 9/1975 |

OTHER PUBLICATIONS

International Search Report and Written Opinion dated Feb. 9, 2018, issued in corresponding International Application No. PCT/AU2017/000239, filed Nov. 15, 2017, 16 pages.

Extended European Search Report dated May 28, 2020, issued in corresponding European Application No. 17874936.2, 10 pages.

* cited by examiner

HEAVY VEHICLE DRUM BRAKE IMPROVEMENTS

PRIORITY DOCUMENTS

The present application claims priority from Australian Provisional Patent Application No. 2016904767 titled "HEAVY VEHICLE DRUM BRAKE IMPROVEMENTS" and filed on 22 Nov. 2016, the content of which is hereby incorporated by reference in its entirety.

TECHNICAL FIELD

The present disclosure relates to vehicle drum brakes. In a particular form the present disclosure relates to heavy vehicle drum brakes, and to a brake shoe assembly for these.

BACKGROUND

Compressed air brake systems are generally used on heavy vehicles such as trucks, and particularly those having one or more trailers which must be linked into the brake system. Reasons for this include the fact that the air brake circuits on trailers can be easily and safely attached, and the supply of air is unlimited, so that systems can never run out of their operating fluid.

Drum brakes are commonly employed on trucks and trailers, because they are considered to be more durable than disc brakes, requiring fewer lining replacements in a given period. What is more, replacement parts for drums are typically cheaper due to a larger economy of scale.

Drum brakes in compressed air brake systems are generally of a cam follower type. That is to say, a free end of each brake shoe comprises a cam follower (a roller) which follow a generally 'S' shaped cam, which depends from a shaft rotationally driven via an air-powered brake booster, which is located outside of the wheel.

In brakes of the aforementioned type, it is known for the brake shoe to become misaligned relative to the drum when the free end of a brake shoe (i.e. the end at the S-cam) becomes laterally (usually inwardly) displaced. Misalignment of the shoes can result in reduced and low braking efficiency, high lining and drum wear resulting in reduced operational life, vehicle pull, noise generation, and even the possibility for the brake shoe to lock onto the drum when braking from high speeds, or for the brake assembly to fail completely.

It is against this background and the problems and difficulties associated therewith that the present invention has been developed.

Certain objects and advantages of the present invention will become apparent from the following description, taken in connection with the accompanying drawings, wherein, by way of illustration and example, an embodiment of the present invention is disclosed.

SUMMARY

According to a first aspect, there is provided a brake shoe comprising a guide at or near its free end, which prevents brake shoe misalignment.

According to a further aspect, there is provided a guide for attachment to a brake shoe at or near its free end, which prevents brake shoe misalignment.

According to a further aspect, there is provided a drum brake assembly comprising a brake shoe comprising the guide.

In one form, the drum brake assembly comprises a stationary carrier upon which a brake shoe is pivotally mounted, the brake shoe comprising a pair of spaced webs, an actuating cam for the brake shoe, a cam follower interposed between the webs and the actuating cam, a rotatably mounted drum brake against which the brake shoe acts, and a brake shoe guide extending from at least an outboard web in front of, and in sliding contact with, an outboard face of the actuating cam.

In one form, the drum brake assembly comprises a pair of oppositely directed brake shoes pivotally mounted on the carrier to act against the drum brake.

In one form, the brake shoes are mounted at one end thereof each upon fixed pivots, with the other ends of the brake shoes carrying the cam followers and receiving the actuating cam between the respective cam followers, by which said other ends of the brake shoes are forced away from each other by the actuating cam, and into contact with the drum brake.

In one form, the or each brake shoe guide is integrally formed with the outboard web of the brake shoe assembly. That is to say, the web and brake shoe guide are one piece.

In one form, in an alternative, the or each brake shoe guide is adapted for retrofit to the web of the brake shoe assembly.

In one form, the actuating cam is an S-cam.

In one form, the or each cam follower is a roller.

According to a further aspect, there is provided a brake shoe for a drum brake assembly, the brake shoe comprising a lining table supporting a brake lining, and a pair of webs, each web comprising a mount for mounting opposite ends of a follower for an actuating cam, and wherein at least one web comprises a brake shoe guide which in use, extends from the web in front of, and in sliding contact with, a face of the actuating cam.

In one form, the web comprising the brake shoe guide is an outboard web in use.

According to a further aspect, there is provided a brake shoe guide for a brake shoe of a drum brake assembly, the brake shoe comprising a lining table supporting a brake lining, and at least one web comprising a mount for a follower for an actuating cam, the brake shoe guide comprising a body adapted for each of securement to and extending from this web, and in front of, and in sliding contact with, a face of the actuating cam when in use.

In one form, a thickness of the body of the brake shoe guide substantially matches a thickness of the web.

In one form, at least a portion of the brake shoe guide is shaped complementarily to at least a portion of the web for securement thereto.

In one form, the brake shoe guide is sized to maximise its sliding contact area with the actuator cam without conflicting with the operation of the drum brake assembly.

In one form, the brake shoe guide is adapted to be secured to the web of the brake shoe by welding. In an alternative, the brake shoe guide is adapted to be secured to the web of the brake shoe by use of an adhesive.

In one form, the brake shoe guide is adapted to be secured to the web of the brake shoe using one or more fasteners. These fasteners may comprise any one or more of screws, bolts, clamps, clips, pins, and/or ties.

According to yet a further aspect, there is provided a method of assembling a drum brake assembly comprising a brake shoe assembly, and a guide for the brake shoe assembly, the method comprising the steps of fitting the brake shoe assembly to the drum brake assembly, and then securing the guide to the brake shoe assembly.

According to yet a further aspect, there is provided a method of assembling a drum brake assembly comprising a brake shoe assembly, and a guide for the brake shoe assembly, the method comprising the steps of fitting the brake shoe assembly to the drum brake assembly, and then securing the guide to the brake shoe assembly.

According to yet a further aspect, there is provided a method of assembling a drum brake assembly comprising a brake shoe assembly, and a guide for the brake shoe assembly, the method comprising the steps of securing the guide to the brake shoe assembly and then fitting the brake shoe assembly replete with the guide to the drum brake assembly.

According to a further aspect, there is provided a brake shoe assembly for a drum brake assembly, the brake shoe assembly comprising a lining table supporting a brake lining, and a pair of parallel webs extending from a back of the lining table, where one web comprises an integral brake shoe guide which makes this web longer than the other web, and wherein the web comprising the brake shoe guide comprises a hole for mounting a cam follower with respect to the web.

In one form, the brake shoe guide widens as it extends lengthwise from the web.

In one form, the brake shoe guide and the web are cut or stamped from a single piece of material.

In one form, the brake shoe guide and the web have the same thickness.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
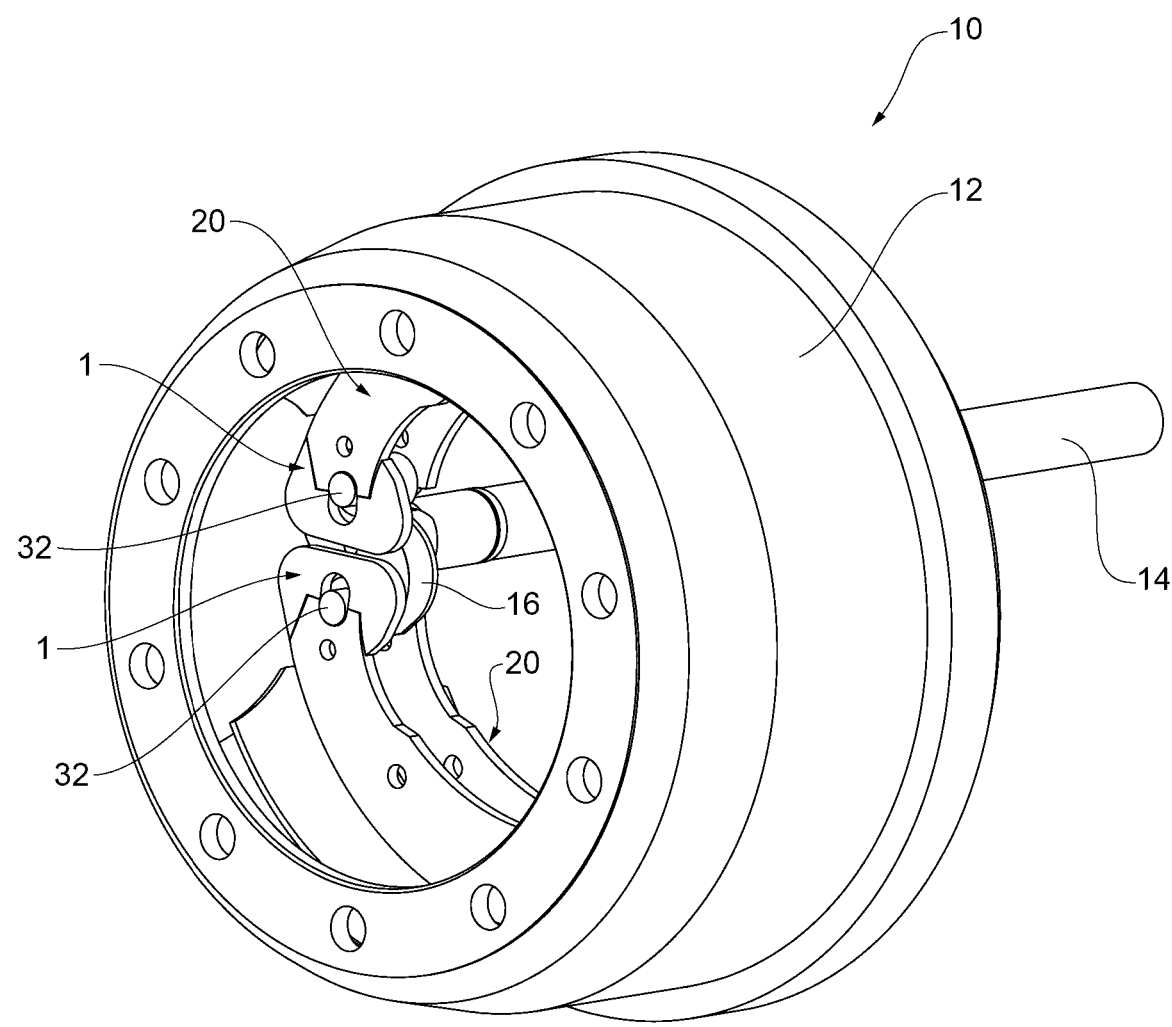
FIG. 1 is an isometric perspective view of a portion of a drum brake assembly for a vehicle.
Figure 2:
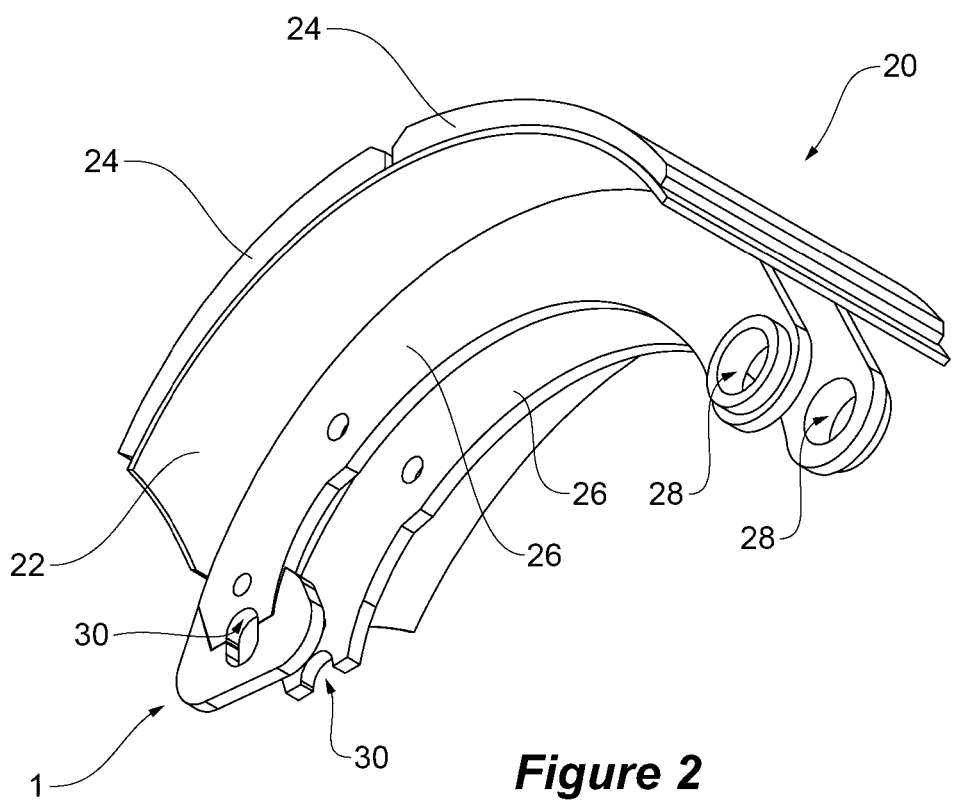
FIG. 2 is an isometric perspective view of a brake shoe assembly (the uppermost one) from the drum brake assembly of FIG. 1, when viewed from an inner side.
Figure 3:
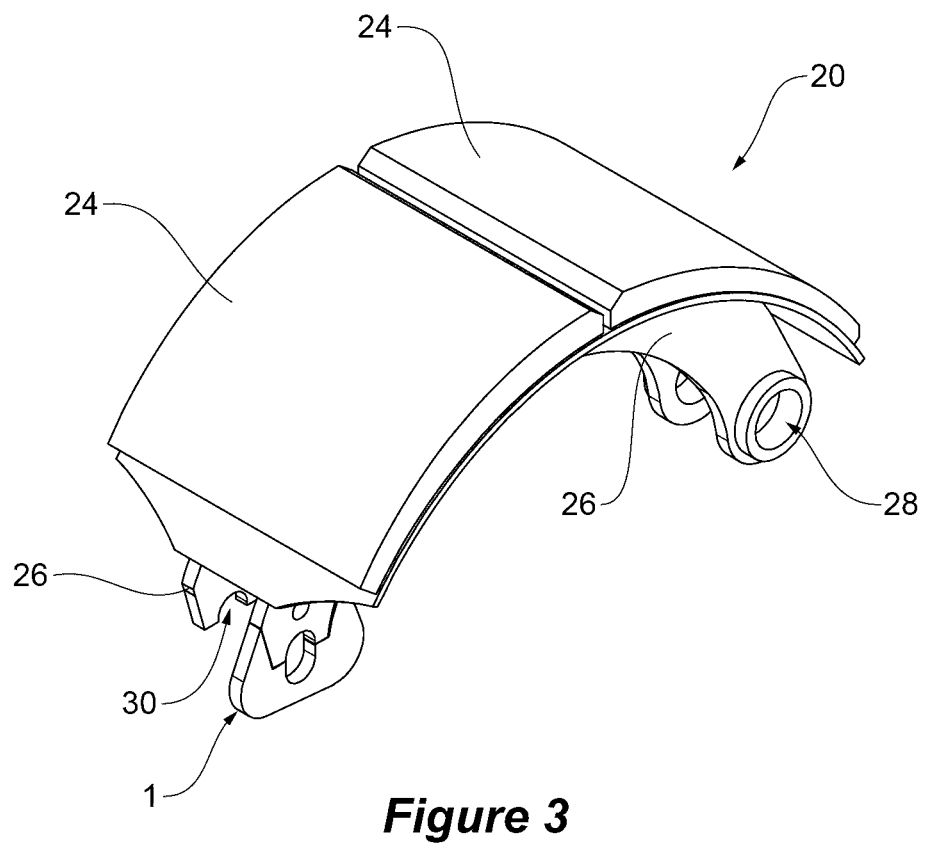
FIG. 3 is an isometric perspective view of the brake shoe assembly of FIG. 2, when viewed from an outer side.
Figure 4:
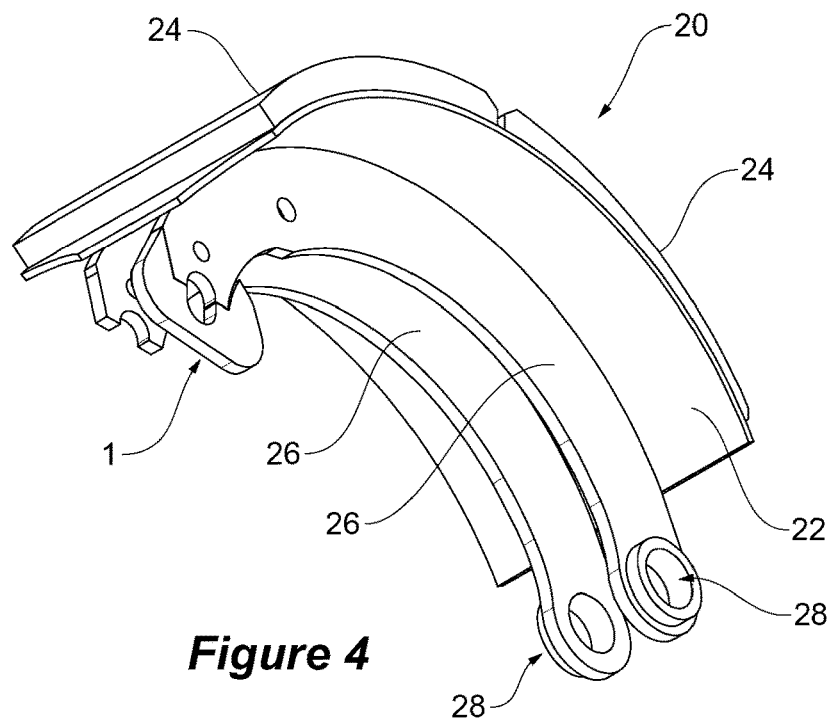
FIG. 4 is an isometric perspective view of the brake shoe assembly of FIG. 2, when viewed from an outer side.
Figure 5:
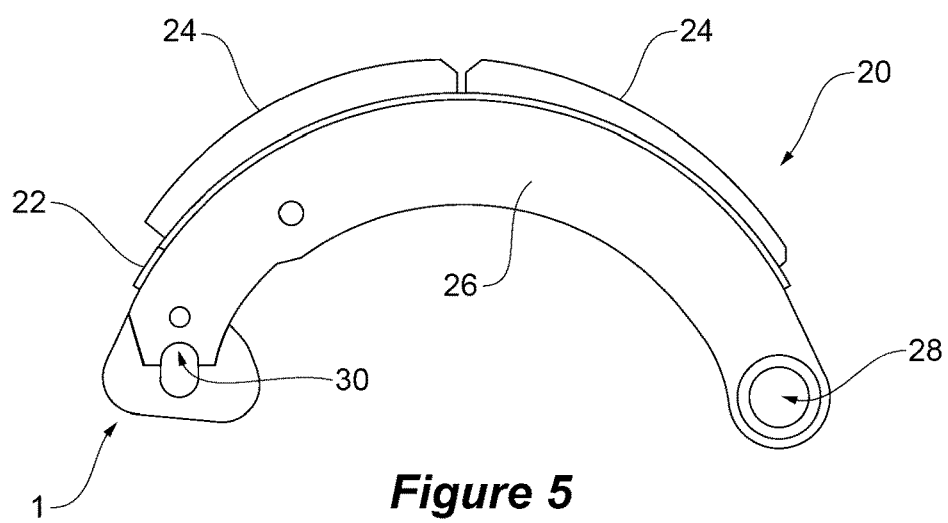
FIG. 5 is a side view of the brake shoe assembly of FIG. 2.
Figure 6:
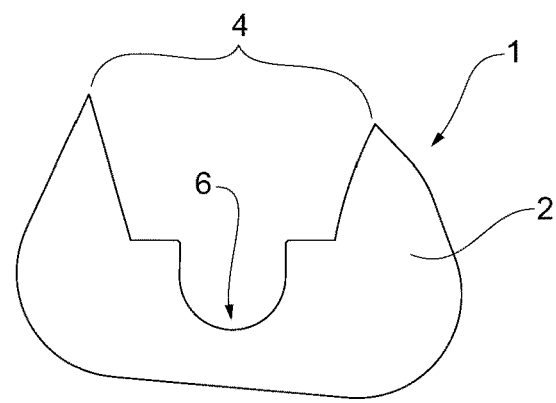
FIG. 6 is a side view of a guide from the brake shoe assembly of FIG. 2.
Figure 7:
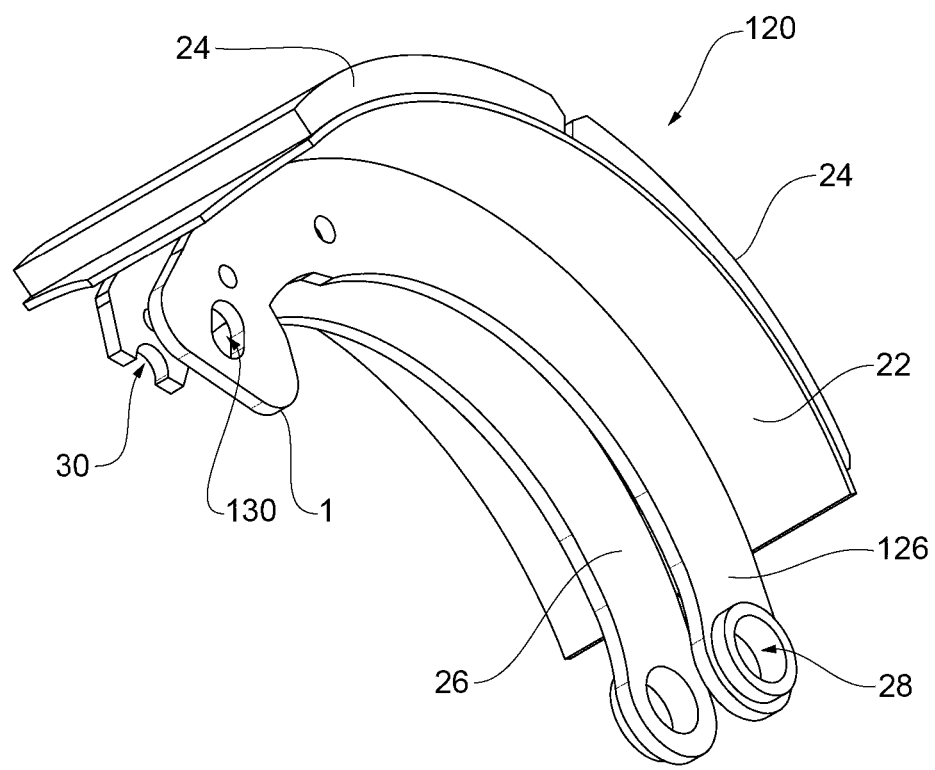
FIGS. 7 through 9 are isometric perspective views of a brake shoe assembly according to a further embodiment.
Figure 8:
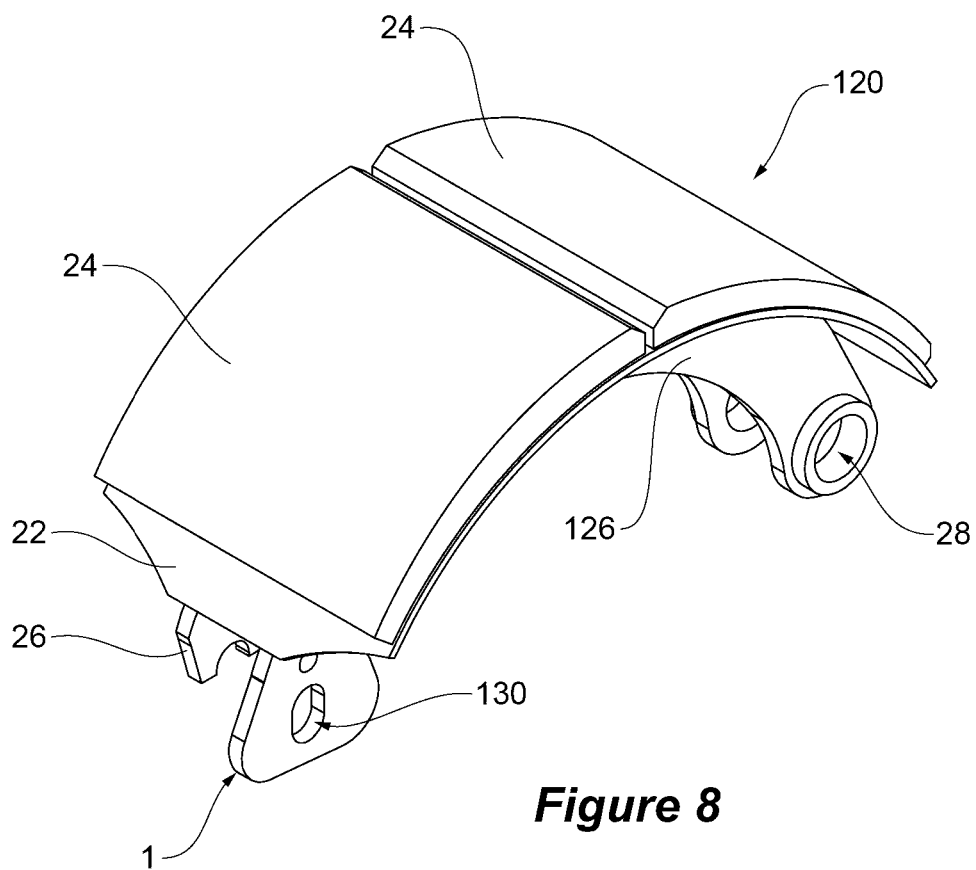
Figure 9:
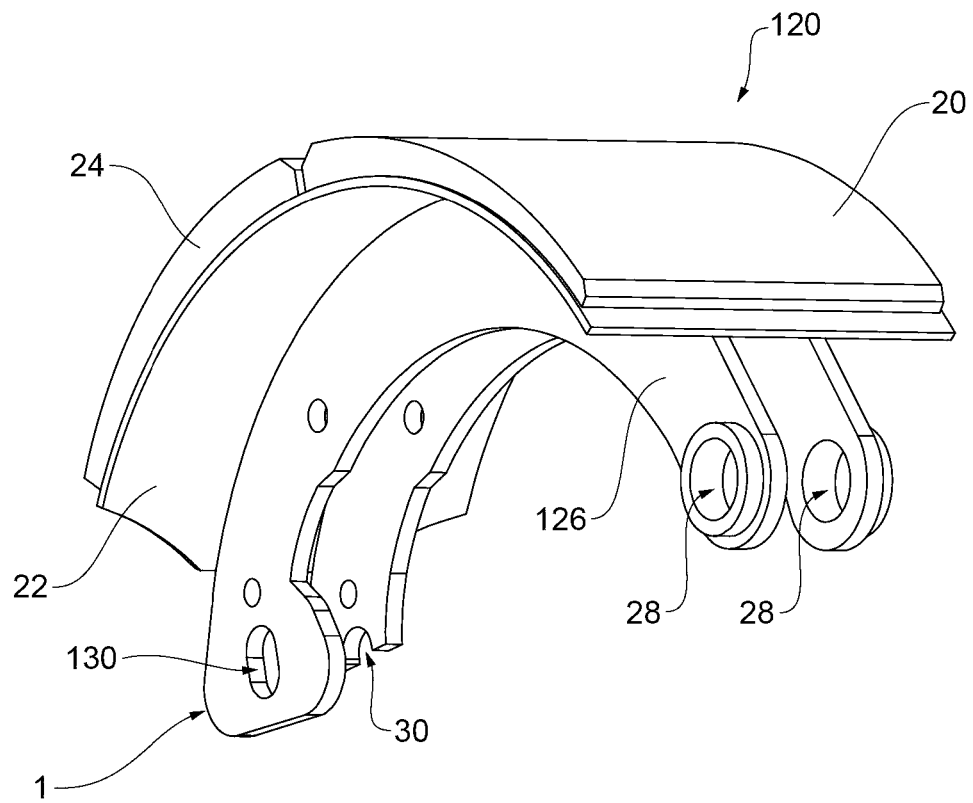
Figure 10:
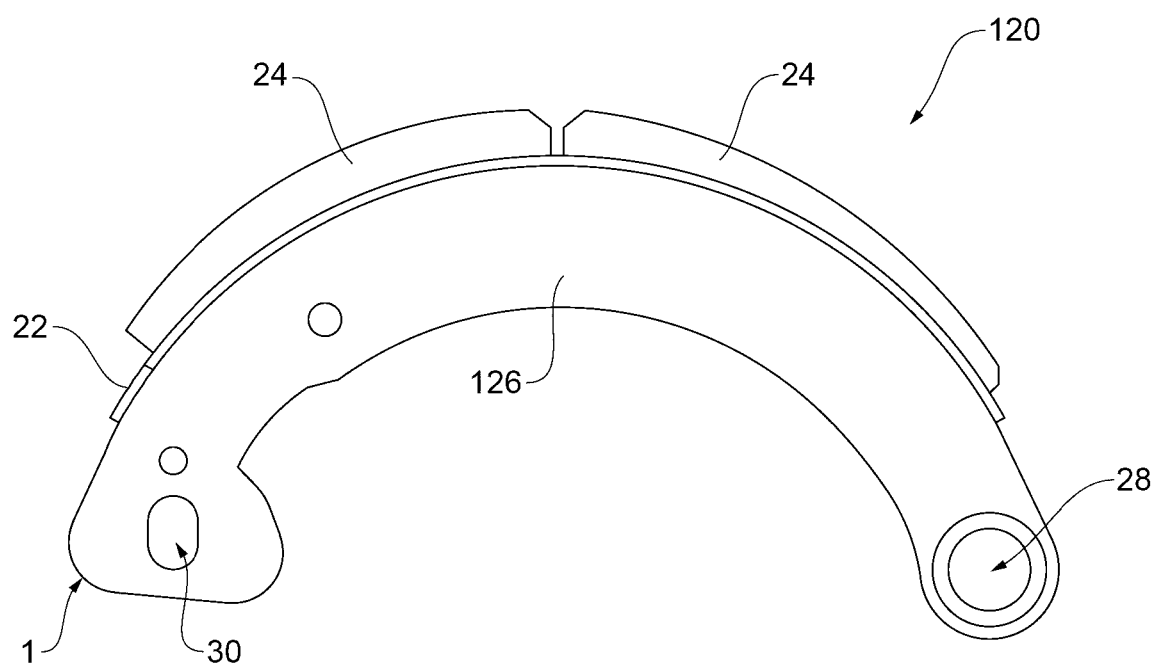
FIG. 10 is a side view of the brake shoe assembly of FIGS. 7 through 9.

Referring now to FIG. 1, there is shown a drum brake assembly 10 from a compressed air brake system of a heavy vehicle such as a semi-trailer prime mover or trailer.

The drum brake assembly 10 comprises a stationary carrier (not illustrated) upon which a pair of arcuate brake shoe assemblies 20 are pivotally mounted in an oppositely directed arrangement, for enclosure within and cooperation with a cylindrical internal surface of a rotatably mounted drum brake 12, to which a wheel assembly of the vehicle is attached.

With reference to FIGS. 2 through 5, each of the brake shoe assemblies comprises a lining table 22 having a working face and a backing face, where a brake lining 24 depends from the working face, and a pair of parallel, spaced apart webs 26 depend from the backing face.

Each web 26 of a given brake shoe assembly 20 comprises one of a pair of mutually aligned anchor pin holes 28, via which that brake shoe assembly 20 is pivotally attached to the stationary carrier. Each web 26 of that brake shoe assembly 20 further comprises, at an end distal to the anchor pin holes 28 (i.e. the free end), one of a pair of mutually aligned generally U-shaped cam follower mounts 30, for mounting opposite ends of a cam follower (or roller) 32 in the form of a roller retained therein by retaining clips (not illustrated).

Referring once more to FIG. 1, the drum brake assembly 10 further comprises a shaft 14 extending from an air-powered brake booster (not illustrated, but typically depending from an axle housing for the wheels) into the drum brake 12, where it terminates at an S-shaped actuating cam (hereinafter S-cam) 16 which interposes the cam follower rollers 32.

In use, when the brake pedal of the vehicle is pushed, compressed air is supplied to the air-powered brake booster, which rotates the S-cam 16 via a push rod, a slack adjuster (i.e. a lever—not shown) and then the shaft 14, driving the brake shoes 20 outward into contact with the drum brake 12.

From an outboard (when in use) web 26 of each brake shoe assembly 20 there depends and extends a brake shoe guide 1. Each brake shoe guide 1 comprises a body 2 which is cut or stamped from a plate of a suitable material (such as a metal), which is of substantially the same thickness as the web 26, which bridges the U-shaped roller mount 30, and which extends in front of, and is in sliding contact with, an outboard face of the S-cam 16. The brake shoe guide 1 is shaped and sized to maximise its sliding contact area with the face of the actuator cam 16, without interfering with the operation of the drum brake assembly 10.

This body 2 of the brake shoe guide 1 comprises a concavity 4 forming into an edge thereof, which is shaped to complement and to nest the roller mount 30 equipped (or other) end of the outboard web 26, and be welded thereto, although alternatively it could be secured thereto by way of fasteners. The concavity 4 comprises a relief slot 6, which is sized and positioned to align with, match and cooperate with the U-shaped roller mount 30 to encircle the end of the cam follower 32, without interfering in the operation of the cam follower 32.

In use, the brake shoe guide 1 will slide against the outboard face of the S-cam without inhibiting its operation, and in doing so, prevent the brake shoe assembly 20 from becoming misaligned with respect to the drum brake 12.

The brake shoe guide 1 prevents the brake shoe 20 from moving inwardly, which can create a side load on the S-cam that causes a circlip retaining the S-cam to release the S-cam, meaning the S-cam can be displaced outwardly until it clashes with an inside of the wheel or drum brake. To this end, the brake shoe 1 guide also aids in preventing any movement of the S-cam should this become unconstrained.

Referring now to FIGS. 7 through 10, where there is illustrated a brake shoe assembly 120 according to a further embodiment. Those parts of the brake shoe assembly 120 which are identical (or near-identical) to corresponding parts shown in the brake shoe assembly 20 of FIGS. 1 through 6, will be denoted by the same reference numerals and will not be described again in detail.

Brake shoe assembly 120 differs from brake shoe assembly 20 principally in that the brake shoe guide 1 is integrally formed with the outermost web 126. That is to say, the brake shoe guide 1 and the outermost web 126 are cut or stamped from a single piece of material during the manufacture of the brake shoe assembly 120. This eliminates the labour cost associated with retrofitting the brake shoe guide 1 to the web 26, and significantly reduces the likelihood of the brake shoe guide 1 breaking away from the web 26.

The web 126 comprising the brake shoe guide 1 comprises a hole 130 (as opposed to a U-shaped mount 30) for mounting a cam follower with respect to the web 126.

The brake shoe guide 1 widens as it extends lengthwise from the web 126 so as to maximise its sliding contact area with the S-cam 16 without conflicting with the operation of the drum brake assembly 10. Maximising this contact area increases the degree of guidance and stability provided.

The shape of the brake shoe guide 1 may vary depending on the particular application, as not all brake shoes or drum brake assemblies are identical. As previously stated, the objective is to maximise its sliding contact area with the S-cam 16 without conflicting with the operation of the drum brake assembly.

From the above, it should be apparent how the guide prevents brake shoe misalignment in brake drums of heavy vehicles.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A drum brake assembly, comprising:
   a stationary carrier;
   a brake shoe pivotally mounted to the stationary carrier and having a pair of spaced webs;
   an actuating cam associated with the brake shoe;
   a cam follower interposed between the webs and the actuating cam;
   a rotatably mounted drum brake against which the brake shoe acts; and
   the brake shoe further comprising a brake shoe guide extending lengthwise from an outboard web so as to make said outboard web longer than the other web, so that said outboard web extends in front of, and in sliding contact with, an outboard face of the actuating cam.

2. The drum brake assembly of claim 1, further comprising a pair of the brake shoes, said pair of the brake shoes being pivotally mounted on the carrier so as to be oppositely directed and to act against the drum brake.

3. The drum brake assembly of claim 2, wherein the brake shoes are mounted at one end thereof each upon fixed pivots, with further ends thereof carrying the cam followers and receiving the actuating cam between the respective cam followers, and wherein the further ends of the brake shoes are forced away from each other into contact with the drum brake by the actuating cam.

4. The drum brake assembly of claim 1, wherein the actuating cam is an S-cam.

5. The drum brake assembly of claim 1, wherein the cam follower is a roller.

6. The drum brake assembly of claim 1, wherein the brake shoe guide is integrally formed with the outboard web of the brake shoe.

7. The drum brake assembly of claim 1, wherein the brake shoe guide is retrofit to the outboard web of the brake shoe.

* * * * *